United States Patent
Iwamoto et al.

(10) Patent No.: US 12,103,181 B2
(45) Date of Patent: Oct. 1, 2024

(54) GARBAGE BOX, GARBAGE COLLECTION SYSTEM, AND GARBAGE COLLECTION METHOD

(71) Applicant: TOYOTA JIDOSHA KABUSHIKI KAISHA, Toyota (JP)

(72) Inventors: Kunihiro Iwamoto, Nagakute (JP); Yutaro Takagi, Tokyo (JP); Yuta Itozawa, Nagoya (JP); Hirotaka Komura, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 443 days.

(21) Appl. No.: 17/520,997

(22) Filed: Nov. 8, 2021

(65) Prior Publication Data
US 2022/0226986 A1 Jul. 21, 2022

(30) Foreign Application Priority Data
Jan. 21, 2021 (JP) .................... 2021-008014

(51) Int. Cl.
| | |
|---|---|
| B65F 1/12 | (2006.01) |
| B25J 9/16 | (2006.01) |
| B25J 11/00 | (2006.01) |
| B65F 1/14 | (2006.01) |
| B65F 1/16 | (2006.01) |

(52) U.S. Cl.
CPC ........... *B25J 9/162* (2013.01); *B25J 9/1664* (2013.01); *B25J 11/0085* (2013.01); *B65F 1/1452* (2013.01); *B65F 1/1473* (2013.01); *B65F 1/16* (2013.01)

(58) Field of Classification Search
CPC ........... B65G 69/0441; B65G 65/4881; B65F 1/1452; B65F 1/1473
USPC .................................................. 414/397, 338
See application file for complete search history.

(56) References Cited

U.S. PATENT DOCUMENTS

| | | | | |
|---|---|---|---|---|
| 96,428 | A | * | 11/1869 | Harrison ............... B65F 3/0206 414/338 |
| 3,263,854 | A | * | 8/1966 | Powers ................. B65F 1/1426 D34/8 |
| 5,236,261 | A | * | 8/1993 | Hagenbuch ............ B65D 88/30 366/26 |
| 5,667,136 | A | * | 9/1997 | Chen ..................... B65F 1/1426 220/909 |
| 6,065,922 | A | * | 5/2000 | Kato ..................... B65G 69/186 141/93 |

(Continued)

FOREIGN PATENT DOCUMENTS

| | | |
|---|---|---|
| CN | 206665429 U | 11/2017 |
| CN | 209210280 U | 8/2019 |

(Continued)

OTHER PUBLICATIONS

Partial translation of Japanese Office Action issued on Feb. 27, 2024 (JP 2021-008014).

*Primary Examiner* — Jonathan Snelting
(74) *Attorney, Agent, or Firm* — Dickinson Wright, PLLC

(57) ABSTRACT

A garbage box includes an opening-closing unit and a switch on a predetermined surface, the switch being a switch by which the opening-closing unit is opened. The garbage box is installed such that the predetermined surface faces a base surface with a predetermined interval from the base surface, the base surface being a floor surface or a ground surface.

12 Claims, 13 Drawing Sheets

(56) References Cited

U.S. PATENT DOCUMENTS

| | | | |
|---|---|---|---|
| 6,328,522 B1 * | 12/2001 | Martz | B65F 9/00 |
| | | | 414/397 |
| 6,793,451 B2 * | 9/2004 | Neufeldt | B65F 3/0206 |
| | | | 414/421 |
| 7,427,182 B2 * | 9/2008 | Galijan | B28C 7/0481 |
| | | | 414/397 |
| 11,420,819 B2 * | 8/2022 | Wolfenden | B65F 1/1473 |
| 11,643,271 B2 * | 5/2023 | Nelson | B65F 1/1615 |
| | | | 232/43.2 |

FOREIGN PATENT DOCUMENTS

| | | |
|---|---|---|
| JP | S44-018152 B | 8/1969 |
| JP | H0516707 A | 1/1993 |
| JP | H1179311 A | 3/1999 |
| JP | 2005330019 A | 12/2005 |
| JP | 2009096636 A | 5/2009 |
| KR | 1020140035061 A | 3/2014 |

* cited by examiner

GARBAGE BOX, GARBAGE COLLECTION SYSTEM, AND GARBAGE COLLECTION METHOD

CROSS-REFERENCE TO RELATED APPLICATION

This application claims priority to Japanese Patent Application No. 2021-008014 filed on Jan. 21, 2021, incorporated herein by reference in its entirety.

BACKGROUND

1. Technical Field

The present disclosure relates to a garbage box, a garbage collection system and a garbage collection method.

2. Description of Related Art

A technology for collecting garbage has been proposed. For example, a delivery robot disclosed in Japanese Unexamined Patent Application Publication No. 2005-330019 (JP 2005-330019 A) transports a garbage box by entering space below the garbage box and supporting the garbage box from below.

SUMMARY

The delivery robot described in JP 2005-330019 A does not collect only the garbage in the garbage box, but collects the garbage box housing the garbage. Therefore, a work for taking the garbage out of the garbage box is not considered, and the garbage cannot be efficiently collected.

The present disclosure has been made in light of the above circumstance, and has an object to provide a garbage box, a garbage collection system and a garbage collection method that make it possible to efficiently collect the garbage by an autonomous mobile robot.

An aspect of the present disclosure for achieving the above object is a garbage box including an opening-closing unit and a switch on a predetermined surface, the switch being a switch by which the opening-closing unit is opened, the garbage box being installed such that the predetermined surface faces a base surface with a predetermined interval from the base surface, the base surface being a floor surface or a ground surface.

With this garbage box, the autonomous mobile robot below the garbage box can easily operate the switch. Further, it is possible to load garbage on the autonomous mobile robot by the drop of the garbage in the garbage box. Accordingly, it is possible to efficiently collect the garbage by the autonomous mobile robot.

In the above aspect, the garbage box may be capable of changing a facing state between a state where the predetermined surface faces the base surface and a state where the predetermined surface does not face the base surface.

Thereby, it is possible to switch installation manner of the garbage box depending on situation, and therefore, it is possible to enhance convenience for operation.

In the above aspect, the garbage box may change the facing state to the state where the predetermined surface faces the base surface, when the garbage box detects that the autonomous mobile robot has come to the vicinity of the garbage box.

Thereby, it is possible to automatically change the attitude of the garbage box to an attitude suitable for the collection of the garbage.

Another aspect of the present disclosure for achieving the above object is a garbage collection system including a garbage box and an autonomous mobile robot, the garbage box including an opening-closing unit and a switch on a predetermined surface, the switch being a switch by which the opening-closing unit is opened, the garbage box being installed such that the predetermined surface faces a base surface with a predetermined interval from the base surface, the base surface being a floor surface or a ground surface, the autonomous mobile robot operating the switch.

With this garbage collection system, the autonomous mobile robot below the garbage box can easily operate the switch. Further, it is possible to load the garbage on the autonomous mobile robot by the drop of the garbage in the garbage box. Accordingly, it is possible to efficiently collect the garbage by the autonomous mobile robot.

In the above aspect, the autonomous mobile robot may include a placement unit on which garbage in the garbage box is placed, the placement unit being capable of rising and falling, and the autonomous mobile robot may operate the switch using the placement unit.

With this configuration, the autonomous mobile robot can operate the switch, even when the autonomous mobile robot does not include a special arm for operating the switch.

In the above aspect, the autonomous mobile robot may operate the switch in a vertical direction, by causing the placement unit to rise.

Thereby, it is possible to operate a switch that can be operated from a lower side, without using a special arm for operating the switch.

In the above aspect, the autonomous mobile robot may operate the switch in a horizontal direction, by moving in a state where the height of the placement unit is a predetermined height.

Thereby, it is possible to operate a switch that can be operated from a lateral side, without using a special arm for operating the switch.

In the above aspect, the autonomous mobile robot may cause the placement unit to rise at a predetermined position.

Thereby, it is possible to soften the impact when the autonomous mobile robot receives the garbage.

In the above aspect, the autonomous mobile robot may cause the placement unit to rise at a predetermined position, and may cause the placement unit to fall in tune with an action in which the opening-closing unit is opened downward.

Thereby, it is possible to soften the impact when the autonomous mobile robot receives the garbage.

Another aspect of the present disclosure for achieving the above object is a method for collecting garbage in a garbage box, the garbage box including an opening-closing unit and a switch on a predetermined surface, the switch being a switch by which the opening-closing unit is opened, the garbage box being installed such that the predetermined surface faces a base surface with a predetermined interval from the base surface, the base surface being a floor surface or a ground surface, an autonomous mobile robot moving to the position of the garbage box, the autonomous mobile robot operating the switch.

With this garbage collection method, the autonomous mobile robot below the garbage box can easily operate the switch. Further, it is possible to load the garbage on the autonomous mobile robot by the drop of the garbage in the garbage box. Accordingly, it is possible to efficiently collect the garbage by the autonomous mobile robot.

With the present disclosure, it is possible to provide a garbage box, a garbage collection system and a garbage collection method that make it possible to efficiently collect the garbage by the autonomous mobile robot.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described below with reference to the drawings.

Embodiment 1

Figure 1:
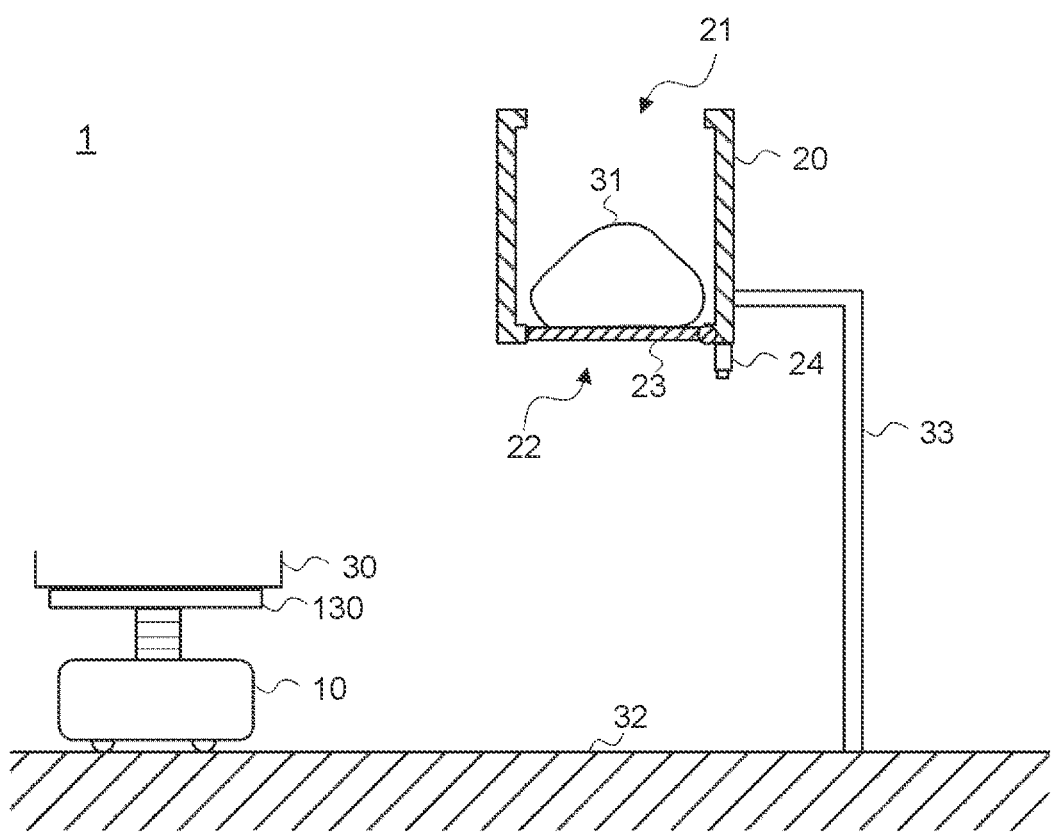
FIG. 1 is a schematic diagram showing an example of a configuration of a garbage collection system according to Embodiment 1.

FIG. 1 is a schematic diagram showing an example of a configuration of a garbage collection system 1 according to the embodiment. As shown in FIG. 1, the garbage collection system 1 includes an autonomous mobile robot 10 and a garbage box 20. FIG. 1 illustrates also a collection box 30 that is placed on a placement unit 130 at an upper portion of the autonomous mobile robot 10. In FIG. 1, the garbage box 20 is shown as a sectional view. For example, the shape of the garbage box 20 is a rectangular parallelepiped shape or a circular column shape. However, the rectangular parallelepiped shape and the circular column shape are just examples, and the shape of the garbage box 20 may be another shape. For example, the garbage box 20 is installed in an arbitrary environment such as a house, a facility, a warehouse, a factory and an outdoor place.

The garbage box 20 shown in FIG. 1 includes a charge port 21 and a discharge port 22. The charge port 21 is an opening portion through which a human or the like throws garbage 31 into the garbage box 20. The charge port 21 is provided on an upper surface of the garbage box 20 in the example shown in FIG. 1, but may be provided on a lateral surface of the garbage box 20.

The discharge port 22 is an opening portion through which the autonomous mobile robot 10 collects the garbage 31 in the garbage box 20. In the discharge port 22, an opening-closing unit 23 is provided. The opening-closing unit 23 is a door (lid) that is provided in the discharge port 22, and switches between a closed state (see FIG. 1) and an opened state (see FIG. 2). The opening-closing unit 23 is a single swing door in the example shown in FIG. 1, but may be a double swing door, or may have a configuration in which three or more doors open and close the discharge port 22. Further, the opening-closing unit 23 is not limited to the configuration in which the discharge port 22 is opened and closed by swing of the door, and may have a configuration in which the discharge port 22 is opened and closed by slide of the door. That is, the opening-closing unit 23 only needs to be a component that switches the discharge port 22 between the closed state and the opened state, and an arbitrary known configuration can be employed as a specific configuration of the opening-closing unit 23. An opening-closing unit is not provided in the charge port 21 in the example shown in FIG. 1, but an opening-closing unit may be provided in the charge port 21.

The discharge port 22 and the opening-closing unit 23 are provided on a predetermined surface of the garbage box 20, and specifically are provided on a bottom surface of the garbage box 20. As shown in FIG. 1, the garbage box 20 is installed such that the opening-closing unit 23 and the discharge port 22 face a base surface 32 that is a floor surface or ground surface, with a predetermined interval from the base surface 32. In other words, the garbage box 20 is installed such that the above-described predetermined surface on which the opening-closing unit 23 is provided faces the base surface 32 and space exists between the opening-closing unit 23 and the base surface 32. The garbage box 20 is supported by a stand 33 in the example shown in FIG. 1, but may be installed on a wall, or may be suspended from an upper structural object such as a ceiling.

On the above-described predetermined surface, the garbage box 20 further include a switch 24 by which the opening-closing unit 23 is opened. That is, a switch 24 is provided at an arbitrary position on the predetermined surface (the bottom surface of the garbage box 20) on which the discharge port 22 and the opening-closing unit 23 are provided. The switch 24 is a switch that is operated by physical force (physical contact), and may be a button or a lever, for example.

When the switch 24 is operated, the opening-closing unit 23 switches from the closed state to the opened state. That is, the opening-closing unit 23 opens the door covering the discharge port 22, and opens the discharge port 22. For example, the opening-closing unit 23 may include an actuator such as a motor, and may switch between the opened state and the closed state using the actuator. The opening-closing unit 23 may transition to the closed state, when a predetermined time elapses after the switching to the opened state. The opening-closing unit 23 may transition to the closed state, when the switch 24 is operated again. The opening-closing unit 23 does not need to include an electric drive mechanism for the action of the door. For example, the door of the opening-closing unit 23 may be opened by the self-weight of the door, the elastic force of an elastic member, or the like. In this case, the door of the opening-closing unit 23 may be opened by the self-weight or elastic force, when an attachment for preventing the opening of the door is detached by the operation of the switch 24, for example. Further, the closing of the door may be performed by a human or a robot, instead of an automatic closing by the garbage box 20.

Figure 2:
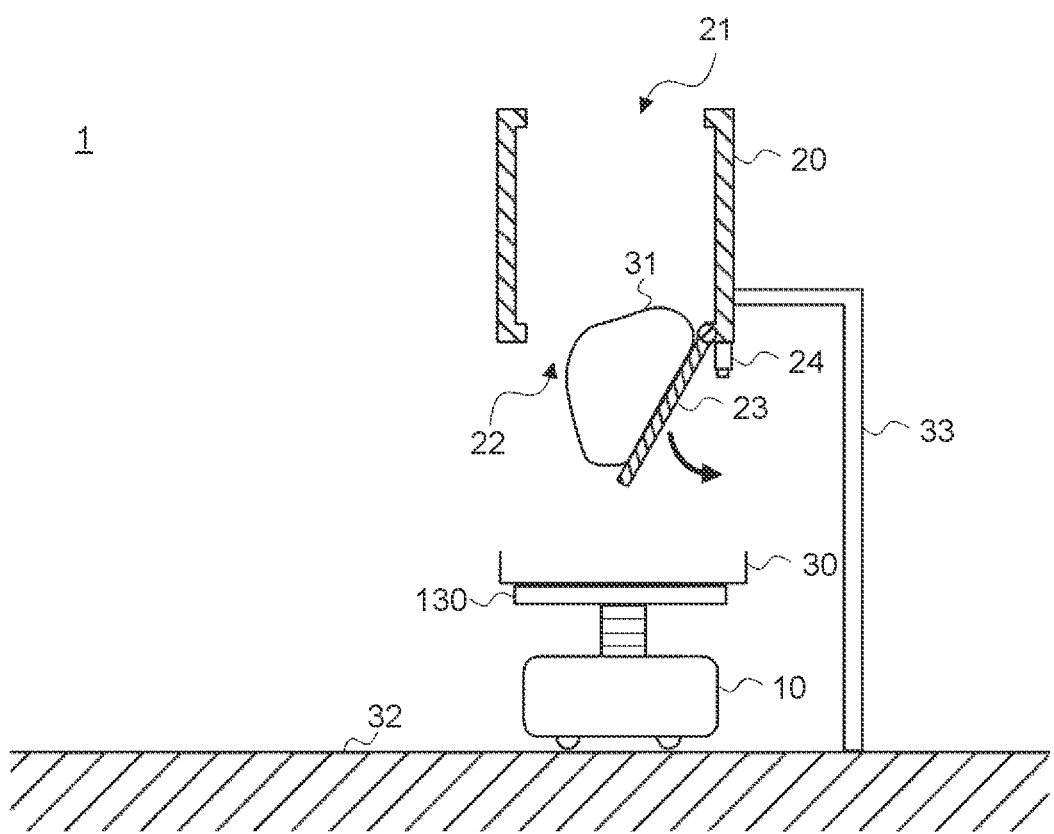
FIG. 2 is a schematic diagram showing a state where an opening-closing unit is opened.

FIG. 2 is a schematic diagram showing a state where the opening-closing unit 23 is opened. As shown in FIG. 2, in the embodiment, the opening-closing unit 23 is opened when the switch 24 is operated. Thereby, the garbage 31 put in the garbage box 20 drops downward, and is placed on a later-described placement unit 130 of the autonomous mobile robot 10. A collection box 30 for taking the collected garbage 31 is placed on the autonomous mobile robot 10 in FIG. 2, but the garbage 31 may be directly placed on the autonomous mobile robot 10 without the use of the collection box 30.

Figure 3:
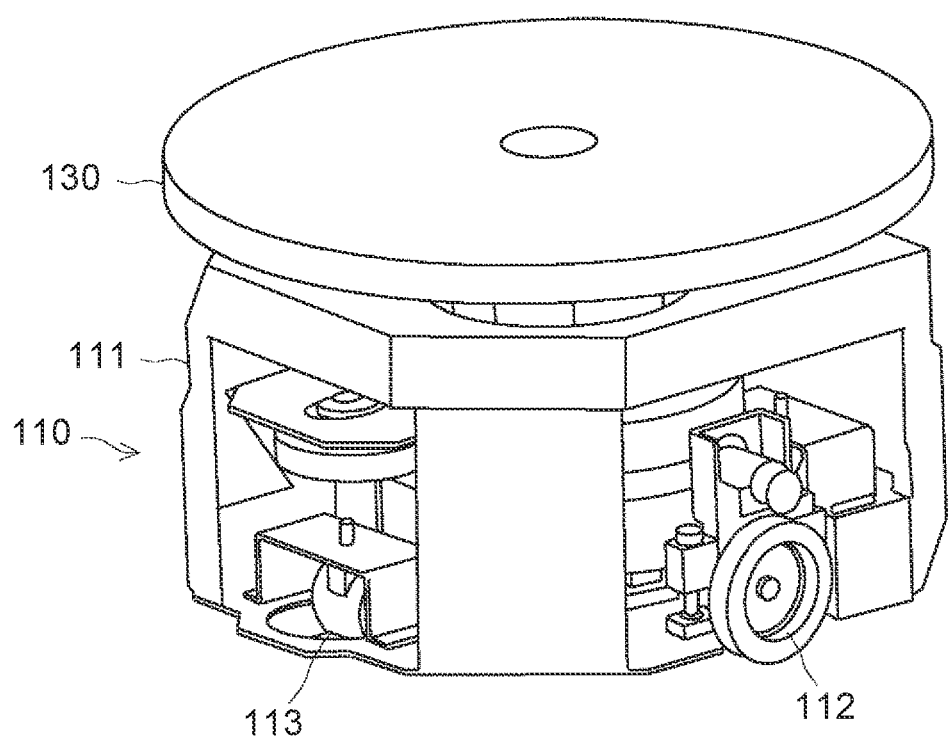
FIG. 3 is a perspective view showing a schematic configuration of an autonomous mobile robot according to the embodiment.
Figure 4:
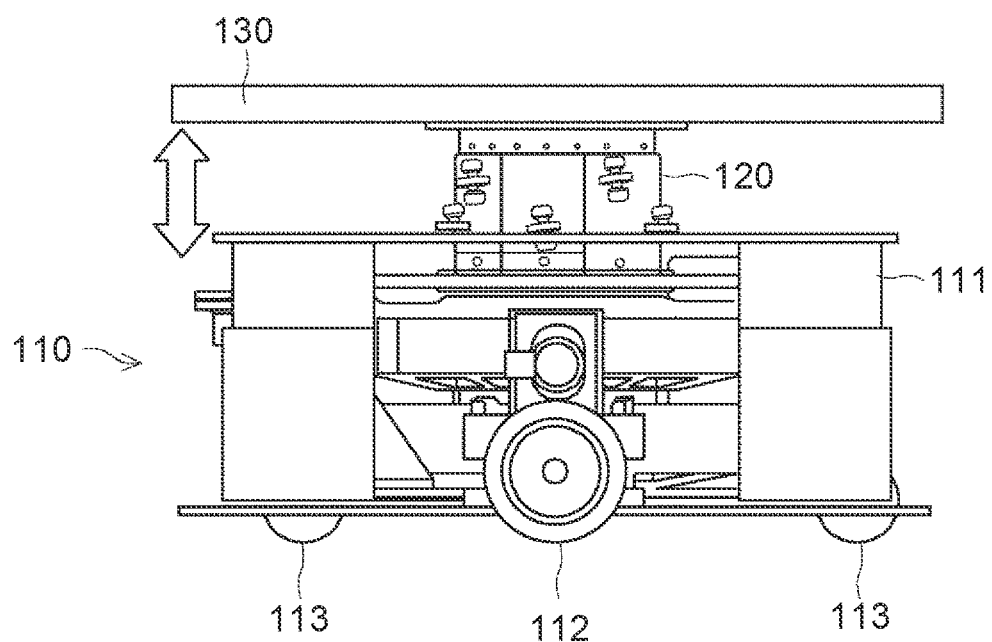
FIG. 4 is a lateral view showing a schematic configuration of the autonomous mobile robot according to the embodiment.
Figure 5:
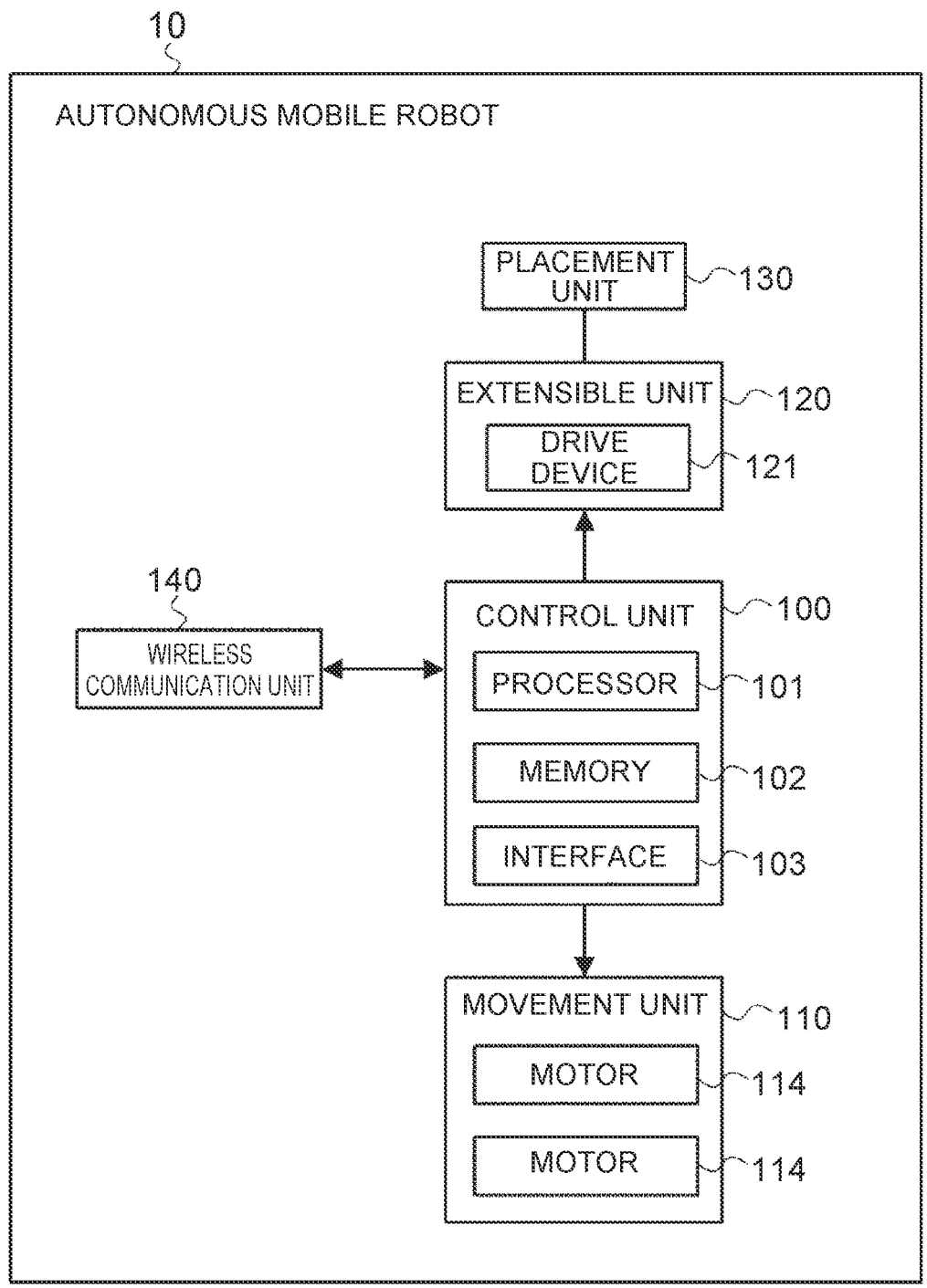
FIG. 5 is a block diagram showing a schematic system configuration of the autonomous mobile robot according to the embodiment.

Next, the autonomous mobile robot 10 will be described. FIG. 3 is a perspective view showing a schematic configuration of the autonomous mobile robot 10 according to the embodiment. FIG. 4 is a lateral view showing a schematic configuration of the autonomous mobile robot 10 according to the embodiment. FIG. 5 is a block diagram showing a schematic system configuration of the autonomous mobile robot 10 according to the embodiment.

For example, the autonomous mobile robot 10 according to the embodiment is a robot that autonomously moves in a movement environment such as a house, a facility, a warehouse, a factory and an indoor place, and collects the garbage 31 in the garbage box 20, and transports the garbage 31 to a predetermined place. For example, the autonomous mobile robot 10 runs on the base surface 32. The autonomous mobile robot 10 according to the embodiment includes a movement unit 110 that can move, an extensible unit 120 that extends and contracts in an up-down direction, the placement unit 130 that supports the placed physical body (the garbage 31), a control unit 100 that performs controls of the autonomous mobile robot 10, which include controls of the movement unit 110 and the extensible unit 120, and a wireless communication unit 140.

The movement unit 110 includes a robot body 111, a pair of right and left driving wheels 112 that are rotatably provided on the robot body 111, a pair of front and rear driven wheels 113 that are rotatably provided on the robot body 111, and a pair of motors 114 that drive and rotate the respective driving wheels 112. The motors 114 rotate the driving wheels 112 through speed reducers and the like. The motors 114 rotate the driving wheels 112 in response to a control signal from the control unit 100, and thereby allows forward movement, rearward movement and rotation of the robot body 111. Thereby, the robot body 111 can move to an arbitrary position. The above configuration of the movement unit 110 is an example, and the present disclosure is not limited to the above configuration. For example, the numbers of the driving wheels 112 and driven wheels 113 of the movement unit 110 may be arbitrary numbers, and an arbitrary configuration can be applied as long as the robot body 111 can move to an arbitrary position.

The extensible unit 120 is an extensible mechanism that extends and contracts in the up-down direction. The extensible unit 120 may be configured as a telescopic extensible mechanism. The placement unit 130 is provided at an upper end portion of the extensible unit 120, and the placement unit 130 rises or falls by the action of the extensible unit 120. The extensible unit 120 includes a drive device 121 such as a motor, and extends and contracts by the drive of the drive device 121. That is, the placement unit 130 rises or falls by the drive of the drive device 121. The drive device 121 is driven in response to a control signal from the control unit 100. In the autonomous mobile robot 10, an arbitrary known mechanism that is provided on an upper side of the robot body 111 and that controls the height of the placement unit 130 may be used instead of the extensible unit 120.

The placement unit 130 is provided on an upper portion (distal end) of the extensible unit 120. The placement unit 130 rises or falls by the drive device 121 such as a motor, and is used for placing the garbage 31 that is transported by the autonomous mobile robot 10. As described above, the collection box 30 for taking the collected garbage 31 may be placed on the placement unit 130 as shown in FIG. 1, but the garbage 31 may be directly placed on the placement unit 130 without the use of the collection box 30. For transportation, the autonomous mobile robot 10 moves together with the garbage 31 (the collection box 30), while the garbage 31 (the collection box 30) is supported by the placement unit 130. Thereby, the autonomous mobile robot 10 transports the garbage 31 (the collection box 30).

For example, the placement unit 130 is formed of a plate material. In the embodiment, the shape of the plate material, that is, the shape of the placement unit 130 is a discoid shape having a flat upper surface, for example, but may be another arbitrary shape.

The wireless communication unit 140 is a circuit that performs wireless communication for communicating with a server, another robot or the like as necessary, and includes a wireless sending-receiving circuit and an antenna, for example. In the case where the garbage box 20 has a communication function, the communication with the garbage box 20 may be performed by the wireless communication unit 140. In the case where the autonomous mobile robot 10 does not communicate with another apparatus, the wireless communication unit 140 may be excluded.

The control unit 100 is a device that controls the autonomous mobile robot 10, and includes a processor 101, a memory 102 and an interface 103. The processor 101, the memory 102 and the interface 103 are connected with each other through a data bus and the like.

The interface 103 is an input-output circuit that is used for communicating with other devices such as the movement unit 110, the extensible unit 120 and the wireless communication unit 140.

For example, the memory 102 is configured by a combination of a volatile memory and a non-volatile memory. The memory 102 is used for storing software (computer program) that is executed by the processor 101 and that includes one or more instructions, data that is used for various processes of the autonomous mobile robot 10, and others.

The processor 101 reads the software (computer program) from the memory 102 and executes the software, to perform a later-described process of the control unit 100.

For example, the processor 101 may be a microprocessor, a micro processing unit (MPU), a central processing unit (CPU), or the like. The processor 101 may include a plurality of processors. In this way, the control unit 100 is a device that functions as a computer.

The above-described program can be stored using various types of non-transitory computer readable media, and can be supplied to the computer. The non-transitory computer readable media include various types of tangible storage media. Examples of the non-transitory computer readable media include a magnetic recording medium (for example, a flexible disk, a magnetic tape and hard disk drive), a magneto-optical recording medium (for example, a magneto-optical disk), a compact disc read only memory (CD-ROM), a CD-R, a CD-R/W, a semiconductor memory (for example, a mask ROM, a programmable ROM (PROM), an erasable PROM (EPROM), a flash ROM, a random access memory (RAM)). Further, the program may be supplied to the computer by various types of transitory computer readable media. Examples of the transitory computer readable media include an electric signal, an optical signal and an electromagnetic wave. The transitory computer readable media can supply the program to the computer, through a wire communication path such as an electric wire and an optical fiber or through a wireless communication path.

Next, a process of the control unit 100 will be described.

The control unit 100 controls the action of the autonomous mobile robot 10. For example, the control unit 100 controls the movement unit 110 and the extensible unit 120. The control unit 100 can control the rotation of each driving wheel 112 and can move the robot body 111 to an arbitrary position, by sending the control signal to each motor 114 of the movement unit 110. Further, the control unit 100 can control the height of the placement unit 130, by sending the control signal to the drive device 121 of the extensible unit 120.

The control unit 100 may control the movement of the autonomous mobile robot 10, by performing a well-known control such as a feedback control and a robust control based on rotation information about the driving wheel 112 detected by a rotation sensor that is provided in the driving wheel 112. Further, the control unit 100 may cause the autonomous mobile robot 10 to autonomously move, by controlling the movement unit 110 based on information including distance information detected by a distance sensor such as a camera or an ultrasonic sensor that is provided in the autonomous mobile robot 10, and map information about a movement environment. In the embodiment, the autonomous mobile robot 10 moves to the position of the garbage box 20. Therefore, the control unit 100 controls the autonomous mobile robot 10 such that the autonomous mobile robot 10 moves to a predetermined position in the vicinity of the installation position of the garbage box 20, that is, to a collection position of the garbage 31 in the garbage box 20 (for example, a position just below the opening-closing unit 23). Then, the control unit 100 controls the autonomous mobile robot 10 such that the autonomous mobile robot 10 operates the switch 24 of the garbage box 20. Thereby, the garbage box 20 can drop the garbage 31 at an appropriate timing, by a simple configuration. Further, in the embodiment, the switch 24 for opening the opening-closing unit 23 is provided on a surface of the garbage box 20 that faces the base surface 32. Therefore, the autonomous mobile robot 10 below the garbage box 20 can easily operate the switch 24. When the autonomous mobile robot 10 receives the garbage 31 dropped from the discharge port 22 of the garbage box 20, the control unit 100 controls the autonomous mobile robot 10 such that the autonomous mobile robot 10 moves to a predetermined place. Thereby, the garbage 31 is transported to the predetermined place by the autonomous mobile robot 10. The autonomous mobile robot 10 may understand that the garbage 31 has been received, from a signal from a sensor such as a weight sensor that measures the weight of the placement unit 130, or from a notice from another device such as the garbage box 20.

Figure 6:
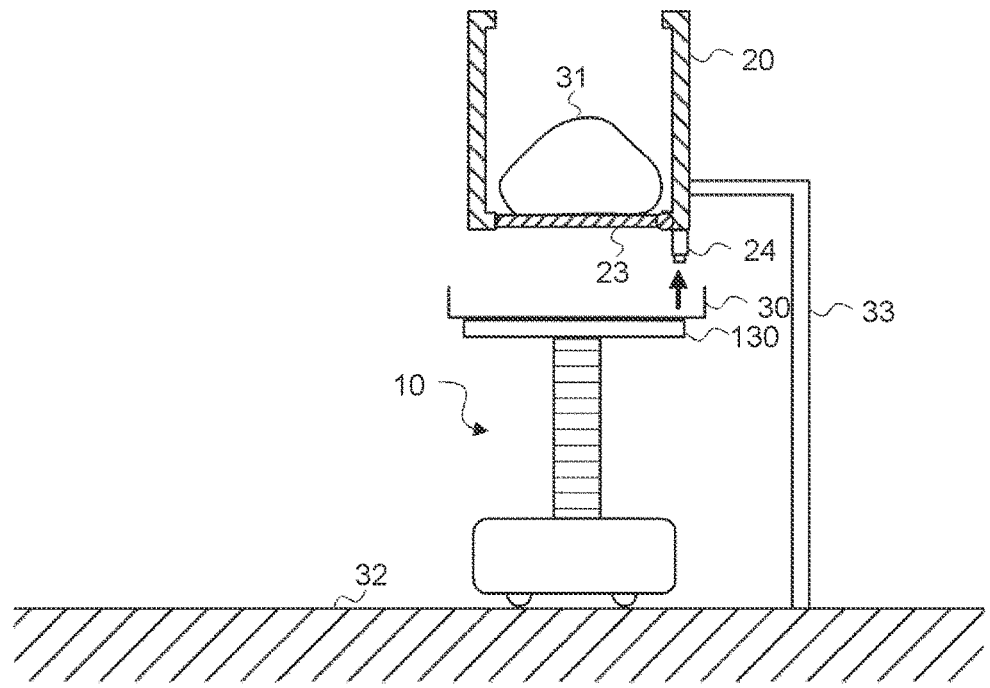
FIG. 6 is a schematic view showing an example of a manner in which the autonomous mobile robot operates a switch of a garbage box according to Embodiment 1.

FIG. 6 is a schematic diagram showing an example of a manner in which the autonomous mobile robot 10 operates the switch 24 of the garbage box 20. In the example shown in FIG. 6, the switch 24 is a button that can be operated from a lower side. In the example shown in FIG. 6, the control unit 100 of the autonomous mobile robot 10 operates the switch 24 in a vertical direction, by causing the placement unit 130 to rise at the predetermined position (the position just below the opening-closing unit 23). That is, the autonomous mobile robot 10 presses the switch 24 upward from the lower side, by causing the placement unit 130 to rise. Thereby, the opening-closing unit 23 is opened, and the garbage 31 moves from the garbage box 20 to the autonomous mobile robot 10.

Figure 7:
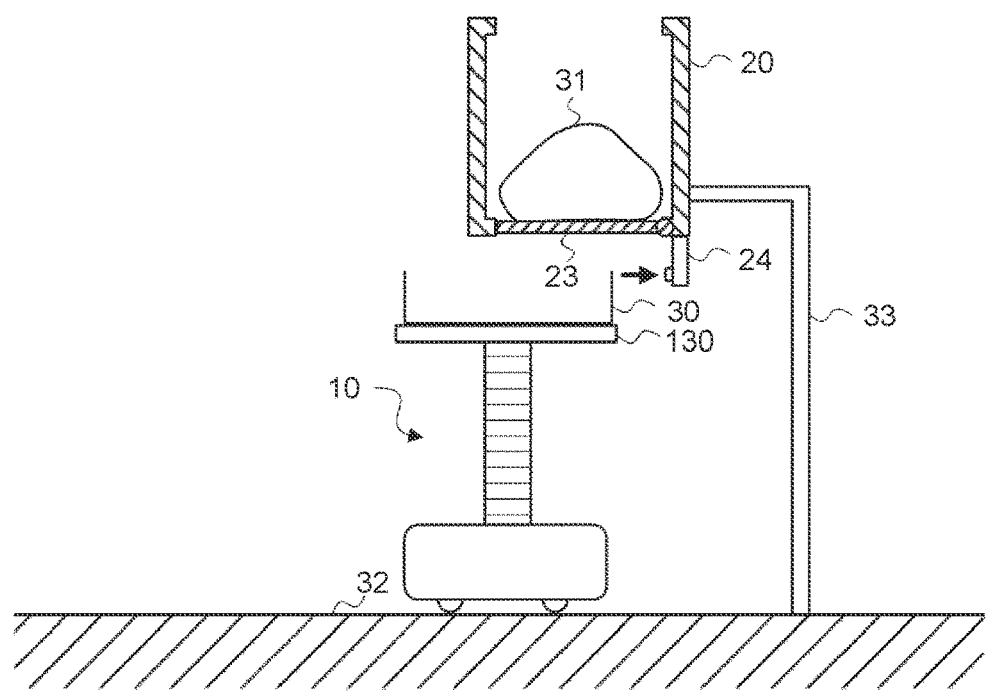
FIG. 7 is a schematic view showing another example of the manner in which the autonomous mobile robot operates the switch of the garbage box according to Embodiment 1.

FIG. 7 is a schematic diagram showing another example of the manner in which the autonomous mobile robot 10 operates the switch 24 of the garbage box 20. In the example shown in FIG. 7, the switch 24 is a button or lever that can be operated from a lateral side. In the example shown in FIG. 7, the control unit 100 of the autonomous mobile robot 10 operates the switch 24 in a horizontal direction, by moving the placement unit 130 to the predetermined position (the position just below the opening-closing unit 23) in the state where the height of the placement unit 130 is a predetermined height. That is, the autonomous mobile robot 10 presses the switch 24 from the lateral side by moving. Thereby, the opening-closing unit 23 is opened, and the garbage 31 moves from the garbage box 20 to the autonomous mobile robot 10.

In this way, the autonomous mobile robot 10 may operate the switch 24 using the placement unit 130. With this configuration, the autonomous mobile robot 10 can operate the switch 24, even when the autonomous mobile robot 10 does not include a special arm for operating the switch 24.

In the case where the autonomous mobile robot 10 operates the switch 24 using the placement unit 130, the operation may be performed by a direct contact of the placement unit 130 with the switch 24, or may be performed by a contact of the collection box 30 on the placement unit 130 with the switch 24. In the case where the operation of the switch 24 is performed through the collection box 30, it is preferable that the collection box 30 be fixed to the placement unit 130. Further, the switch 24 may be operated by a human who confirms that the autonomous mobile robot 10 has come to the predetermined position.

Since the autonomous mobile robot 10 receives the garbage 31 dropped from the garbage box 20 with the placement unit 130, the impact when the autonomous mobile robot 10 receives the dropped garbage 31 is high in the case where the distance from the placement unit 130 to the garbage box 20 is long. Accordingly, in this case, there is fear of the failure of the autonomous mobile robot 10, the dispersion of the garbage 31, or the like. Therefore, at the time of the collection of the garbage 31, the control unit 100 may cause the placement unit 130 to rise at the collection position of the garbage 31 (the position just below the opening-closing unit 23). Thereby, it is possible to soften the impact when the autonomous mobile robot 10 receives the garbage 31. For example, the control unit 100 may cause the placement unit 130 to rise to a level of the height to a lower end of the motion range of the opening-closing unit 23. For example, the height to the lower end of the motion range of the opening-closing unit 23 may be previously stored in the memory 102. Further, at the time of the collection of the garbage 31, the control unit 100 may perform the following control as shown in FIG. 8A to FIG. 8D. FIG. 8A to FIG. 8D are schematic diagrams showing the control of the height of the placement unit 130 by the control unit 100 in order.

Figure 8A:
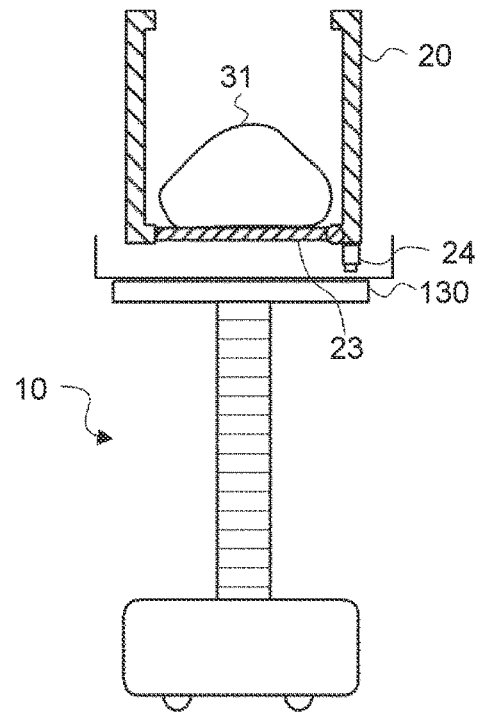
FIG. 8A is a schematic diagram for describing a control by a control unit at the time of collection of the garbage.
Figure 8B:
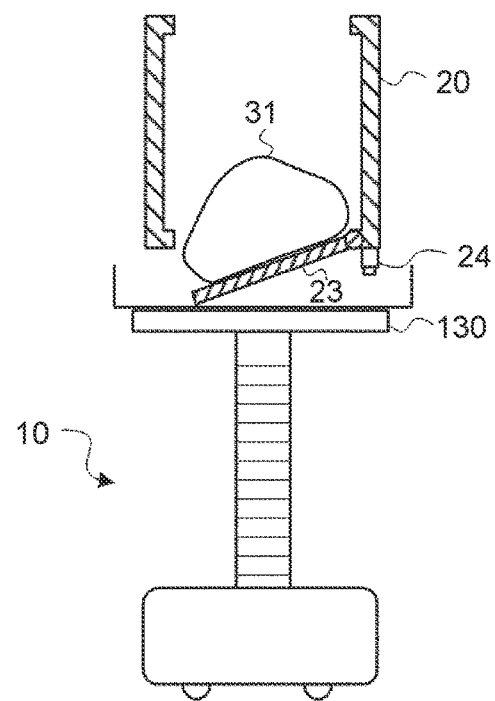
FIG. 8B is a schematic diagram for describing the control by the control unit at the time of the collection of the garbage.
Figure 8C:
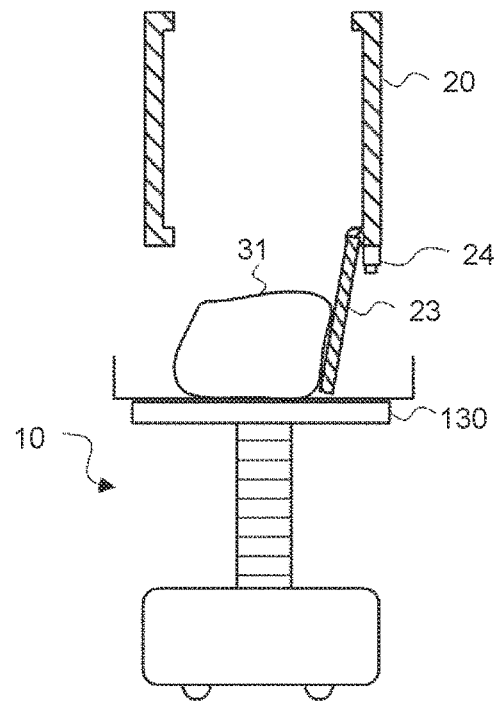
FIG. 8C is a schematic diagram for describing the control by the control unit at the time of the collection of the garbage.
Figure 8D:
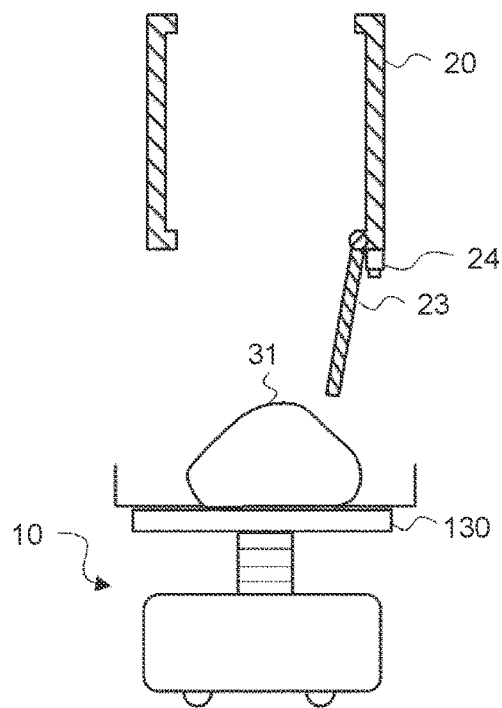
FIG. 8D is a schematic diagram for describing the control by the control unit at the time of the collection of the garbage.

First, the control unit 100 causes the placement unit 130 to rise to a level corresponding to the height of the opening-closing unit 23 (see FIG. 8A). For causing the placement unit 130 to rise to the level corresponding to the height of the opening-closing unit 23, the autonomous mobile robot 10 may acquire the height of the opening-closing unit 23 by measuring the height of the opening-closing unit 23 using a distance sensor, or may acquire the height of the opening-closing unit 23 by reading the height previously stored in the memory 102. Next, the control unit 100 causes the opening-closing unit 23 in tune with the action in which the opening-closing unit 23 is opened downward (see FIG. 8B and FIG. 8C). For example, the control unit 100 may control the fall of the placement unit 130 in accordance with the output value of a distance sensor that detects the distance between the placement unit 130 and the opening-closing unit 23. Further, in the case where the opening-closing unit 23 is opened by the self-weight, the elastic force of an elastic member, or the like, the control unit 100 may cause the opening-closing unit 23 to fall at a predetermined speed when a weight sensor, a contact sensor or the like detects that the placement unit 130 starts to support the opening-closing unit 23. Further, in the case where the start timing of the opening action of the opening-closing unit 23 can be acquired by a notice from the garbage box 20 or the like, the control unit 100 may cause the placement unit 130 to fall at a predetermined speed corresponding to the speed of the opening of the opening-closing unit 23. Thereafter, the control unit 100 causes the placement unit 130 to further fall such that the autonomous mobile robot 10 with the garbage 31 and the opening-closing unit 23 do not hit against each other (FIG. 8D). In this way, the control unit 100 may cause the placement unit 130 to rise at the collection position (the position just below the opening-closing unit 23) of the garbage 31, and may cause the placement unit 130 in tune with the action in which the opening-closing unit 23 is opened downward. Thereby, it is possible to soften the impact when the autonomous mobile robot 10 receives the garbage 31.

Embodiment 1 has been described above. As described above, the garbage box 20 according to the embodiment includes the opening-closing unit 23 and the switch 24 on the predetermined surface of the garbage box 20, and is installed such that the opening-closing unit 23 and the switch 24 face the base surface 32 with the predetermined interval from the base surface 32. Therefore, the autonomous mobile robot 10 below the garbage box 20 can easily operate the switch 24. Therefore, it is possible to load the garbage 31 on the autonomous mobile robot 10, by the drop of the garbage 31 in the garbage box 20. Accordingly, it is possible to efficiently collect the garbage by the autonomous mobile robot.

Embodiment 2

Figure 9A:
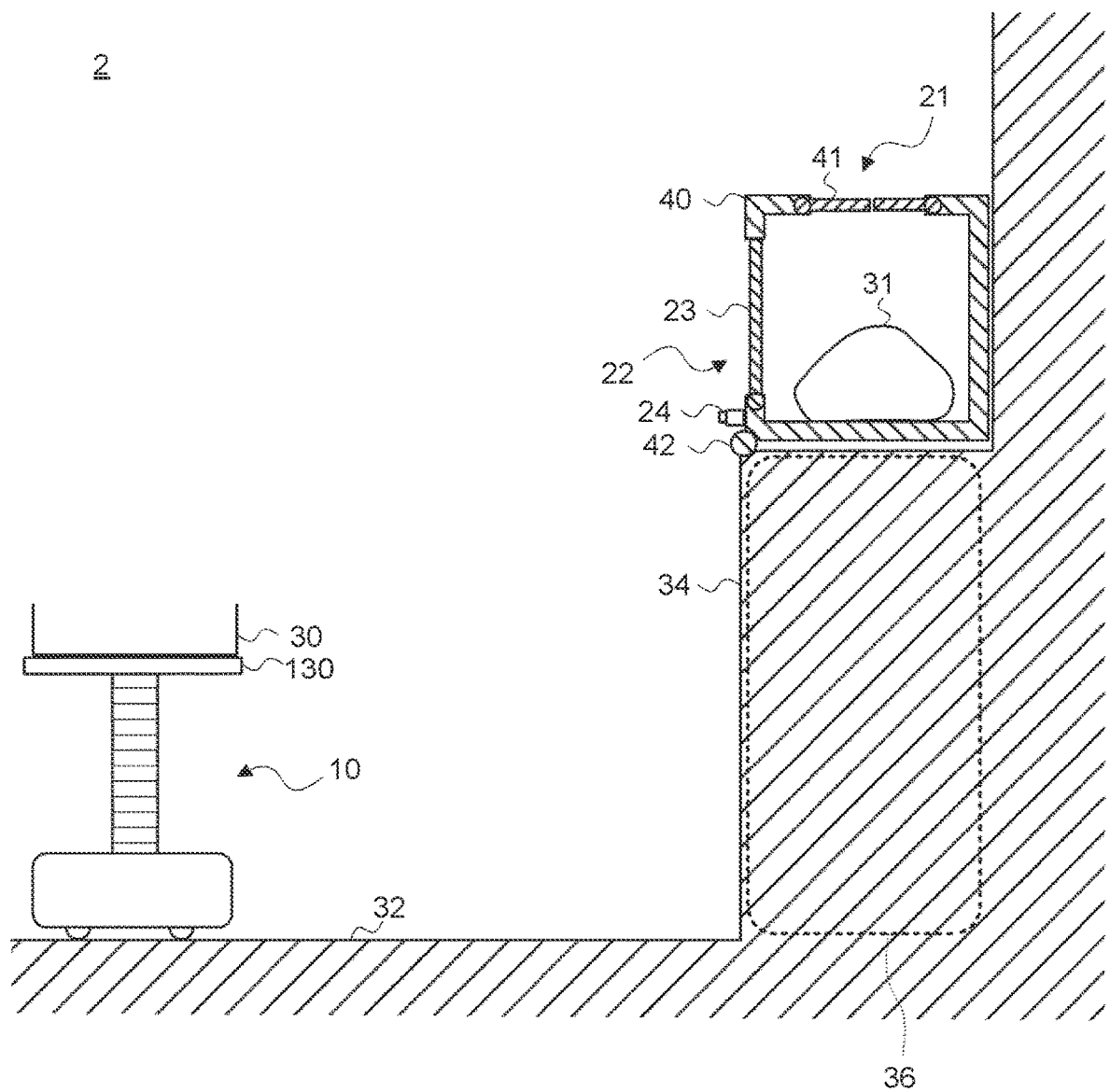
FIG. 9A is a schematic diagram showing an example of a configuration of a garbage collection system according to Embodiment 2.
Figure 9B:
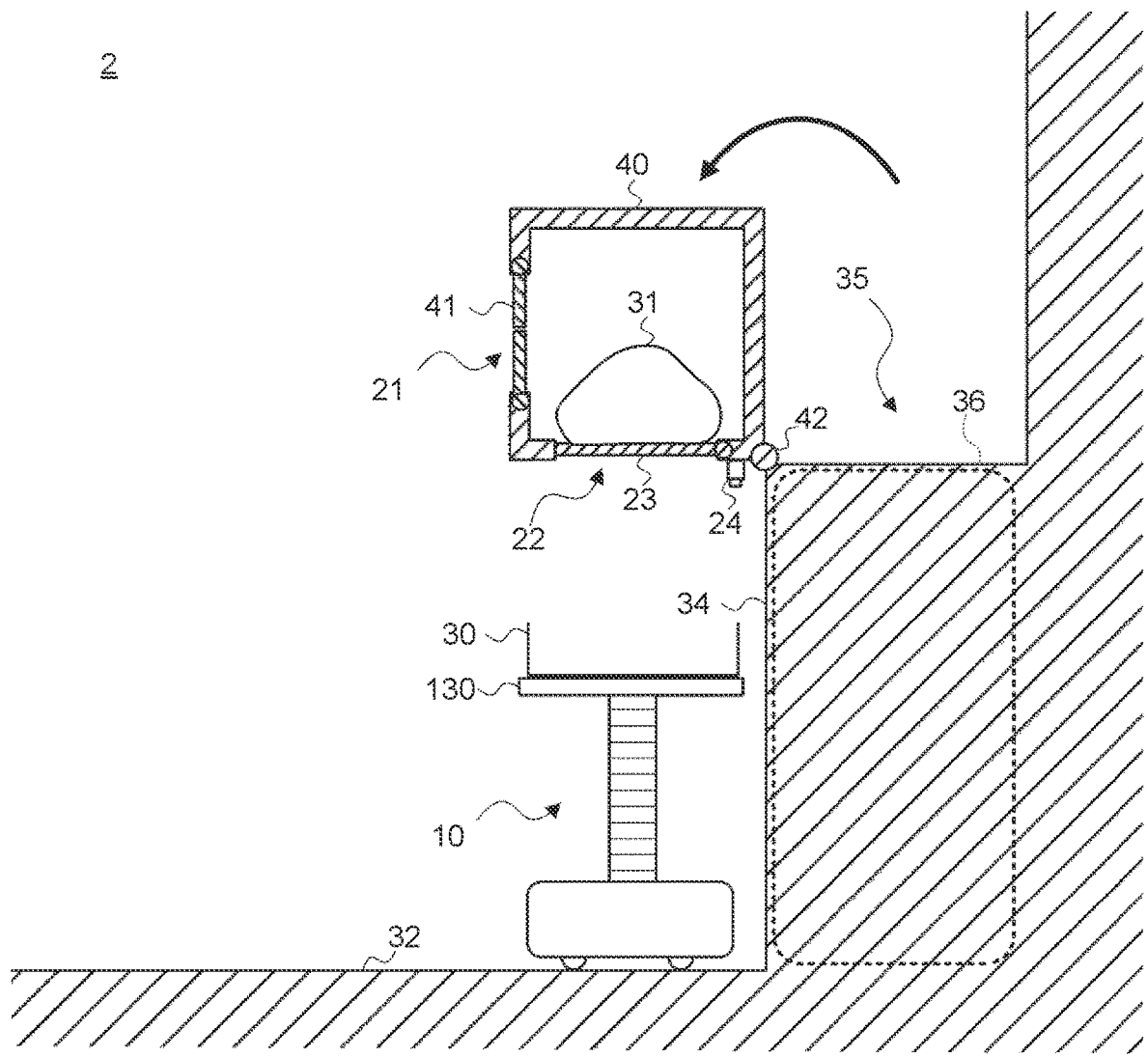
FIG. 9B is a schematic diagram showing the example of the configuration of the garbage collection system according to Embodiment 2.

Next, Embodiment 2 will be described. The embodiment is different from the above-described embodiment, in that the garbage box can change the facing state. FIG. 9A and FIG. 9B are schematic diagrams showing an example of a configuration of a garbage collection system 2 according to Embodiment 2. FIG. 9A and FIG. 9B illustrate also the collection box 30 that is placed on the placement unit 130 of the autonomous mobile robot 10. In FIG. 9A and FIG. 9B, a garbage box 40 is shown as a sectional view. For example, the shape of the garbage box 40 is a rectangular parallelepiped shape or a circular column shape. However, the rectangular parallelepiped shape and the circular column shape are just examples, and the shape of the garbage box 40 may be another shape.

As shown in FIG. 9A and FIG. 9B, the garbage collection system 2 is different from the garbage collection system 1 in Embodiment 1, in that the garbage box 40 capable of changing the facing state is used instead of the garbage box 20. FIG. 9A is a schematic diagram showing an example of a state where a predetermined surface (a surface on which the opening-closing unit 23 is provided) of the garbage box 40 does not face the base surface 32. FIG. 9B is a schematic diagram showing an example of a state where the predetermined surface (the surface on which the opening-closing unit 23 is provided) of the garbage box 40 faces the base surface 32. Hereinafter, the state where the surface of the garbage box 40 on which the opening-closing unit 23 is provided does not face the base surface 32 is referred to as a charge acceptance state, and the state where the surface of the garbage box 40 on which the opening-closing unit 23 is provided faces the base surface 32 is referred to as a discharge state.

The garbage box 40 includes a charge port 21 and a discharge port 22, similarly to the garbage box 20. As shown in FIG. 9A and FIG. 9B, on the garbage box 40, the charge port 21 is provided on a surface that is an upper surface in the charge acceptance state and that is a lateral surface in the discharge state. The charge port 21 may be provided on a surface that is a lateral surface in both the charge acceptance state and the discharge state (on a surface on a near side or far side of sheet planes of FIG. 9A and FIG. 9B). It is preferable that an opening-closing unit 41 be provided in the charge port 21, for avoiding the garbage 31 from spilling from the charge port 21 when the garbage box 40 becomes the discharge state. The opening-closing unit 41 is a door (lid) that is provided in the charge port 21.

In the garbage box 40, an opening-closing unit 23 is provided in the discharge port 22. Further, in the embodiment also, the garbage box 40 includes a switch 24 by which the opening-closing unit 23 is opened. The discharge port 22, the opening-closing unit 23 and the switch 24 are provided on a predetermined surface of the garbage box 40. Specifically, as shown in FIG. 9A and FIG. 9B, in the garbage box 40, the discharge port 22, the opening-closing unit 23 and the switch 24 are provided on a surface that is a lateral surface in the charge acceptance state and that is a bottom surface in the discharge state. In the embodiment, as shown in FIG. 9B, the garbage box 40 is installed such that the opening-closing unit 23, discharge port 22 and switch 24 of the garbage box 40 in the discharge state face the base surface 32 with a predetermined interval from the base surface 32. Specifically, the garbage box 40 includes a rotation shaft 42, and is installed on a wall 34 by the rotation shaft 42. That is, the garbage box 40 is installed on the wall 34 such that the facing state can be changed by rotating the rotation shaft 42 as the shaft for rotation. As shown in FIG. 9A and FIG. 9B, a cutout 35 that can house the garbage box 40 in the charge acceptance state is provided in the wall 34. It can be said that the garbage box 40 is installed on a seat 36 for placing the garbage box 40 in the charge acceptance state. When the garbage box 40 in the charge acceptance state rotates 90 degrees and the garbage box 40 becomes the discharge state (see FIG. 9B), the surface on which the opening-closing unit 23 is provided faces the base surface 32, and space exists between the opening-closing unit 23 and the base surface 32.

In this way, the garbage box 40 can change the facing state between the state where the surface on which the opening-closing unit 23 (the discharge port 22) and the switch 24 are provided faces the base surface 32 and the state where the surface does not the base surface 32, that is, the state where the surface is oriented in a direction other than the direction of the base surface 32. More specifically, the garbage box 40 is rotatably provided, and can change the facing state between the discharge state where the surface on which the opening-closing unit 23 (the discharge port 22) and the switch 24 are provided faces the base surface 32 and the charge acceptance state where the attitude stands up from the discharge state.

Figure 10:
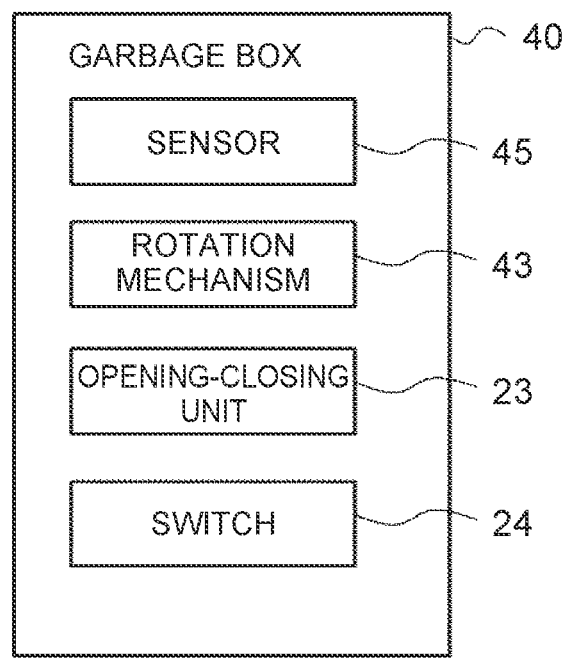
FIG. 10 is a block diagram showing an example of constituent elements relevant to discharge of the garbage in a garbage box according to Embodiment 2.

FIG. 10 is a block diagram showing constituent elements relevant to the discharge of the garbage in the garbage box 40 according to the embodiment. As shown in FIG. 10, the garbage box 40 according to the embodiment includes a sensor 45 and a rotation mechanism 43, in addition to the opening-closing unit 23 and the switch 24.

The sensor 45 is a sensor that detects that the autonomous mobile robot 10 has come to the predetermined position. The predetermined position is the collection position of the garbage 31, and specifically, is the position just below the opening-closing unit 23 when the garbage box 40 is in the discharge state. The sensor 45 may detect whether a physical body having come to the predetermined position is the autonomous mobile robot 10, or may be a sensor that detects that an arbitrary physical body has come to the predetermined position. For example, the sensor 45 may be an image sensor that performs the detection by processing an image in a camera. The sensor 45 is not limited to the image sensor, and an arbitrary known sensor that can detect that a physical body (the autonomous mobile robot 10) is at the predetermined position, as exemplified by a distance sensor, can be used.

The rotation mechanism 43 is a mechanism that includes an actuator such as a motor for changing the facing state of the garbage box 40, in addition to the rotation shaft 42 described above. The rotation mechanism 43 rotates the garbage box 40 based on a detection signal from the sensor 45. That is, when the autonomous mobile robot 10 has come to the predetermined position and thereby the rotation mechanism 43 has received the detection signal from the sensor 45, the rotation mechanism 43 changes the facing state of the garbage box 40, and switches the state of the garbage box 40 from the charge acceptance state to the discharge state. In this way, when the garbage box 40 detects that the autonomous mobile robot has come to the vicinity of the garbage box 40, the garbage box 40 changes the facing state to the state where the surface having the opening-closing unit 23 and the switch 24 faces the base surface 32. Therefore, it is possible to automatically change the attitude of the garbage box 40 to an attitude suitable for the collection of the garbage 31. The rotation mechanism 43 may return to the charge acceptance state, when a predetermined time elapses after the change in the state of the garbage box 40 to the discharge state. The rotation mechanism 43 may change the facing state of the garbage box 40 from the discharge state to the charge acceptance state, when the sensor 45 detects that the autonomous mobile robot 10 has left the vicinity (the predetermined position) of the garbage box 40.

The opening-closing unit 23 switches from the closed state to the opened state, when the switch 24 is operated after the garbage box 40 becomes the discharge state. Similarly to Embodiment 1, the autonomous mobile robot 10 operates the switch 24 by the contact of the placement unit 130 or collection box 30 with the switch 24, for example. Thereby, in the embodiment also, the autonomous mobile robot 10 can collect the garbage 31. In the embodiment also, the opening-closing unit 23 may transition to the closed state when a predetermined time elapses after the transition to the opened state. The opening-closing unit 23 may transition to the closed state when the sensor 45 detects that the autonomous mobile robot 10 has left the predetermined position.

Embodiment 2 has been described above. In the embodiment, as described above, the garbage box 40 can change the facing state between the state where the surface on which the opening-closing unit 23 (the discharge port 22) is provided faces the base surface 32 and the state where the surface does not face the base surface 32. Thereby, it is possible to switch installation manner of the garbage box 40 depending on situation, and therefore, it is possible to enhance convenience for operation.

In the above description, the garbage box 40 changes the facing state of the garbage box 40 based on the detection result of the sensor 45. The facing state of the garbage box 40 may be changed by a human, instead of being automatically changed.

Figure 11:
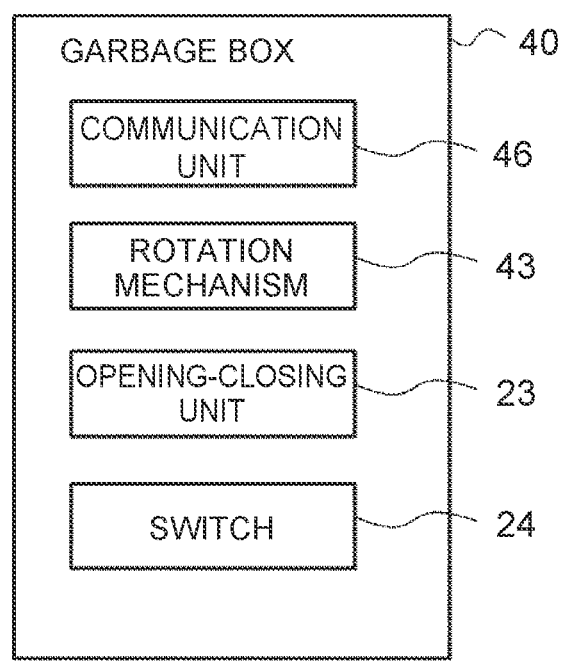
FIG. 11 is a block diagram showing another example of the constituent elements relevant to the discharge of the garbage in the garbage box according to Embodiment 2.

The garbage box 40 may change the facing state of the garbage box 40 not based on the detection result of the sensor 45 but based on a notice from another apparatus. FIG. 11 is a block diagram showing constituent elements relevant to the discharge of the garbage in the garbage box 40 that changes the facing state based on the notice from the other apparatus. In this case, as shown in FIG. 11, the garbage box 40 includes a communication unit 46 instead of the sensor 45. The communication unit 46 is a circuit that communicates with the other apparatus, and includes a sending-receiving circuit that sends and receives a signal by wire or by wireless.

The garbage box 40 having the configuration shown in FIG. 11 changes the facing state based on the notice that the communication unit 46 receives from the other apparatus. That is, when the notice from the other apparatus is received, the rotation mechanism 43 changes the facing state of the garbage box 40, and switches the facing state of the garbage box 40 from the charge acceptance state to the discharge state. In this way, the garbage box 40 may understand that the autonomous mobile robot has been to the vicinity of the garbage box 40, based on the notice from the other apparatus. For example, the other apparatus may be the autonomous mobile robot 10. In this case, when the autonomous mobile robot 10 has arrived at the predetermined position (the collection position of the garbage 31), the autonomous mobile robot 10 gives a notice indicating the arrival, to the garbage box 40. When the communication unit 46 of the garbage box 40 receives the notice from the autonomous mobile robot 10, the rotation mechanism 43 changes the facing state of the garbage box 40. Further, the above-described other apparatus may be a server that manages the progress of execution of tasks of the autonomous mobile robot 10. In this case, when the server understands that the autonomous mobile robot 10 has arrived at the predetermined position, for example, through the notice from the autonomous mobile robot 10, the server gives a notice indicating that the autonomous mobile robot 10 has arrived at the predetermined position, to the garbage box 40. Then, when the communication unit 46 of the garbage box 40 receives the notice from the server, the rotation mechanism 43 changes the facing state of the garbage box 40. Further, the above-described other apparatus may be a sensor apparatus or the like that is provided on the base surface 32 or the like. In this case, when the sensor apparatus detects that the autonomous mobile robot 10 has arrived at the predetermined position, the sensor apparatus gives a notice indicating the arrival, to the garbage box 40. Then, when the communication unit 46 of the garbage box 40 receives the notice from the sensor apparatus, the rotation mechanism 43 changes the facing state of the garbage box 40.

Figure 12A:
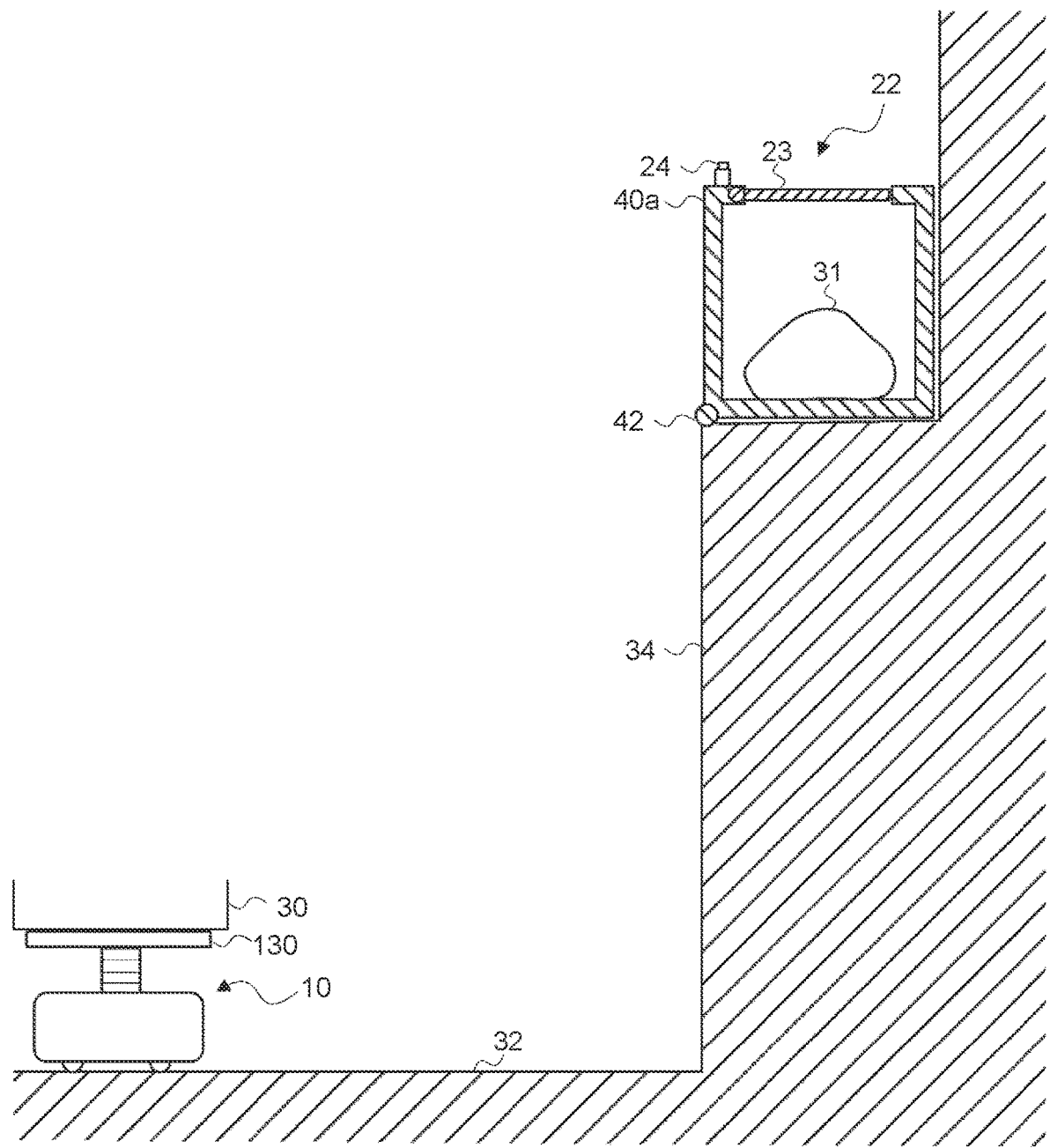
FIG. 12A is a schematic diagram showing another example of the configuration of the garbage collection system according to Embodiment 2.
Figure 12B:
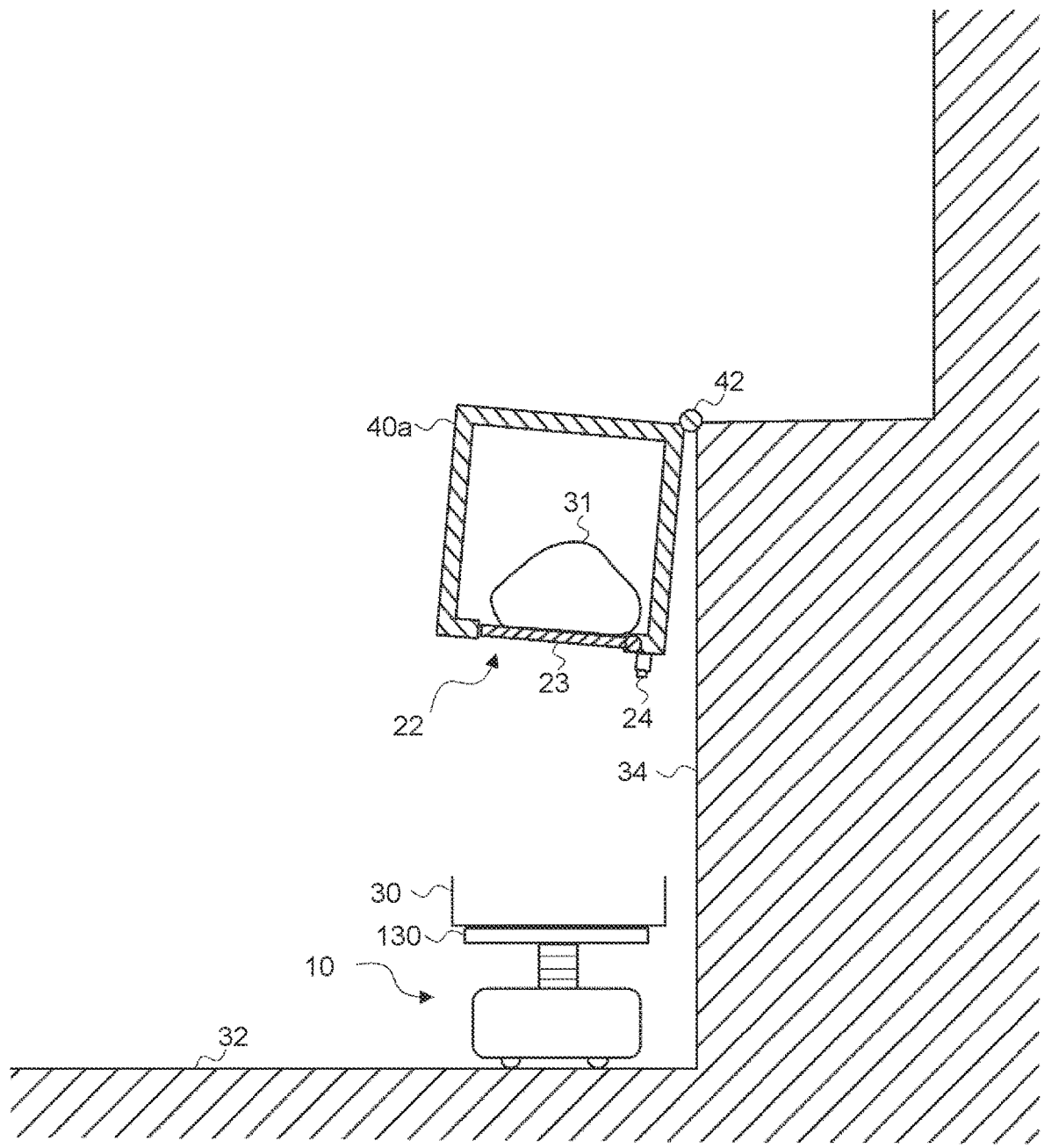
FIG. 12B is a schematic diagram showing the other example of the configuration of the garbage collection system according to Embodiment 2.

In the example shown in FIG. 9A and FIG. 9B, the garbage box rotates 90 degrees, but the angle of the rotation is 90 degrees or more. FIG. 12A and FIG. 12B are schematic diagrams showing another example of the configuration of the garbage collection system 2 according to Embodiment 2. Differences from the configuration described with reference to FIG. 9A and FIG. 9B will be described below, and repetitive descriptions will be omitted when appropriate. In the example shown in FIG. 12A and FIG. 12B, a garbage box 40a is used instead of the garbage box 40. FIG. 12A is a schematic diagram showing an example of a state where a predetermined surface (a surface on which an opening-closing unit 23 is provided) of the garbage box 40a does not face the base surface 32, and FIG. 12B is a schematic diagram showing an example of a state where the predetermined surface (the surface on which the opening-closing unit 23 is provided) of the garbage box 40a faces the base surface 32.

The garbage box 40a is different from the above-described garbage box 40, in that the garbage box 40a is inverted by rotation. In the garbage box 40a, the charge port may be provided on a surface that is a lateral surface (that is, a surface other than the upper surface and the bottom surface) in both the charge acceptance state and the discharge state, and may serve also as a discharge port 22. In the garbage box 40a, the discharge port 22 and the opening-closing unit 23 are provided on a surface that is an upper surface in the charge acceptance state and that is a bottom surface in the discharge state. A rotation mechanism 43 of the garbage box 40a rotates and inverts the garbage box 40a, and thereby, the garbage box 40a switches between the charge acceptance state and the discharge state. In this way, the garbage box may switch between the charge acceptance state and the discharge state, by inversion.

The embodiments have been described above. The present disclosure is not limited to the above embodiments, and can be appropriately modified without departing from the spirit.

What is claimed is:

1. A garbage collection system including a garbage box and an autonomous mobile robot,
the garbage box including an opening-closing unit and a switch on a predetermined surface, the switch being a switch by which the opening-closing unit is opened,
the garbage box being installed such that the predetermined surface faces a base surface with a predetermined interval from the base surface, the base surface being a floor surface or a ground surface,
the autonomous mobile robot moving to a position of the garbage box,
the autonomous mobile robot operating the switch, and
the autonomous mobile robot collecting the garbage in the garbage box.

2. The garbage collection system according to claim 1, wherein:
the autonomous mobile robot includes a placement unit on which garbage in the garbage box is placed, the placement unit being capable of rising and falling; and
the autonomous mobile robot operates the switch using the placement unit.

3. The garbage collection system according to claim 2, wherein the autonomous mobile robot operates the switch in a vertical direction, by causing the placement unit to rise.

4. The garbage collection system according to claim 2, wherein the autonomous mobile robot operates the switch in a horizontal direction, by moving in a state where a height of the placement unit is a predetermined height.

5. The garbage collection system according to claim 2, wherein the autonomous mobile robot causes the placement unit to rise at a predetermined position.

6. The garbage collection system according to claim 2, wherein the autonomous mobile robot causes the placement unit to rise at a predetermined position, and causes the placement unit to fall in tune with an action in which the opening-closing unit is opened downward.

7. A method for collecting garbage in a garbage box,
the garbage box including an opening-closing unit and a switch on a predetermined surface, the switch being a switch by which the opening-closing unit is opened,
the garbage box being installed such that the predetermined surface faces a base surface with a predetermined interval from the base surface, the base surface being a floor surface or a ground surface,
an autonomous mobile robot moving to a position of the garbage box,
the autonomous mobile robot operating the switch.

8. The method according to claim 7, wherein:
the autonomous mobile robot includes a placement unit on which garbage in the garbage box is placed, the placement unit being capable of rising and falling; and
the autonomous mobile robot operates the switch using the placement unit.

9. The method according to claim 8, wherein the autonomous mobile robot operates the switch in a vertical direction, by causing the placement unit to rise.

10. The method according to claim 8, wherein the autonomous mobile robot operates the switch in a horizontal direction, by moving in a state where a height of the placement unit is a predetermined height.

11. The method according to claim 8, wherein the autonomous mobile robot causes the placement unit to rise at a predetermined position.

12. The method according to claim 8, wherein the autonomous mobile robot causes the placement unit to rise at a predetermined position, and causes the placement unit to fall in tune with an action in which the opening-closing unit is opened downward.

* * * * *